United States Patent [19]

Hirozawa et al.

[11] Patent Number: 5,262,078
[45] Date of Patent: Nov. 16, 1993

[54] CORROSION-INHIBITING AUTOMOTIVE COOLANT SOLUTIONS CONTAINING EFFECTIVE AMOUNTS OF SODIUM SILICATES AND SODIUM NITRATE, AND METHODS OF INHIBITING CORROSION OF AUTOMOTIVE COOLING SYSTEMS USING SUCH COOLANT SOLUTIONS

[75] Inventors: Stanley T. Hirozawa, Birmingham; David E. Turcotte, Woodhaven, both of Mich.

[73] Assignee: BASF Corporation, Parsippany, N.J.

[21] Appl. No.: 683,954

[22] Filed: Apr. 12, 1991

[51] Int. Cl.$^5$ .......................... C09K 5/00; F28F 23/00
[52] U.S. Cl. ......................................... 252/71; 252/75; 252/389.3; 422/14; 422/18
[58] Field of Search ............... 252/75, 78.3, 74, 389.3, 252/71; 422/7, 14, 18

[56] References Cited

U.S. PATENT DOCUMENTS

| | | | |
|---|---|---|---|
| 2,961,291 | 11/1960 | Pickett et al. | 422/14 |
| 2,961,292 | 11/1960 | Pickett et al. | 422/16 |
| 3,312,622 | 4/1967 | Pines et al. | 252/75 |
| 3,340,001 | 9/1967 | Thornhill | 252/389.3 |
| 3,977,893 | 8/1976 | Wason | 423/335 |
| 4,149,985 | 4/1979 | Wilson | 252/74 |
| 4,241,014 | 12/1980 | Hirozawa et al. | 252/389.3 |
| 4,374,743 | 2/1983 | Stockel | 252/70 |
| 4,404,114 | 9/1983 | Mohr et al. | 252/75 |
| 4,426,309 | 1/1984 | Abel et al. | 252/75 |
| 4,457,852 | 7/1984 | Bosen | 252/78.3 |
| 4,460,478 | 7/1984 | Mohr et al. | 252/75 |
| 4,676,919 | 6/1987 | Zientek | 252/75 |
| 4,759,864 | 7/1988 | Van Neste et al. | 252/75 |

OTHER PUBLICATIONS

Hirozawa et al, "Use of Electrochemical Noise in the Study of Inhibitor Systems", Electrochem. Impedance of Practical Corrosion Predictions (Nov. 5, 1991).
R. K. Iler, "The Chemistry of Silica", pp. 375-376 (1979).
S. T. Hirozawa, "Study of the Mechanism for the Inhibition of Localized Corrosion of Aluminum by Galvanostaircase Polarization", Corrosion Inhibition, NACE, pp. 105-112 (1988).
Epelboin et al, "Use of Impedance Measurements for the Determination of the Instant Rate of Metal Corrosion", J. Appl. Electrochem., vol. 2, pp. 71-79 (1972).
Mansfeld, "Recording and Analysis of AC Impedance Data for Corrosion Studies", Corrosion Science, vol. 36, No. 5, pp. 301-307 (1981).
Mansfeld, "Recording and Analysis of AC Impedance Data for Corrosion Studies", Corrosion Science, vol. 38, No. 11, pp. 570-580 (1982).
Lorenz et al, "Determination of Corrosion Rates by Electrochemical DC and AC Methods", Corrosion Science, vol. 21, pp. 647-672 (1981).
Boukamp, "Non-Linear Least Squares Fit Analysis of AC-Impedance Measurements", Electrochem. Soc., pp. 146-151 (1985).
ASTM Standard G100, ASTM Book of Standards, vol. 3.02, pp. 384-387 (1989).
Hirozawa, Silver/Silver Sulfide Reference Electrode (1991).
Koch et al, "The AC Electrical Impedance of a Fractal Boundary to an Electrolytic Solution", J. Electrochem. Soc. vol. 138, No. 2, pp. 475-484 (1991).

*Primary Examiner*—Christine Skane
*Attorney, Agent, or Firm*—Nixon & Vanderhye

[57] ABSTRACT

Non-corrosive anti-freeze solutions for automotive cooling systems include an anti-corrosive effective amount of a sodium silicate corrosion inhibitor, and sodium nitrate. The sodium silicate has an unusually low ratio of silica to sodium oxide of greater than 1.0 to about 2.4. This relatively low ratio of silica to sodium oxide prevents gelation from occurring while the synergistic combination of the sodium silicate and sodium nitrate maintains maximum anti-corrosive effectiveness of alcohol-based solutions containing the same.

8 Claims, 3 Drawing Sheets

CORROSION-INHIBITING AUTOMOTIVE COOLANT SOLUTIONS CONTAINING EFFECTIVE AMOUNTS OF SODIUM SILICATES AND SODIUM NITRATE, AND METHODS OF INHIBITING CORROSION OF AUTOMOTIVE COOLING SYSTEMS USING SUCH COOLANT SOLUTIONS

FIELD OF INVENTION

The present invention generally relates to coolant solutions used in automotive cooling systems. More specifically, the present invention relates to coolant solutions which inhibit corrosion in automotive cooling systems.

BACKGROUND AND SUMMARY OF THE INVENTION

Concentrated alcohol-based solutions are conventionally added to water in automotive cooling systems so as to provide anti-freeze protection. These water/alcohol heat transfer fluids are further inhibited from attack on the metal forming the automotive cooling systems by numerous corrosion-inhibiting additives.

The use of inorganic sodium silicates as corrosion-inhibiting agents is well known. However, sodium silicates tend to gel when used in corrosion-inhibiting effective amounts in alcohol-based coolant solutions. This "gelation" of the corrosion-inhibiting inorganic sodium silicates is problematic since the corrosion-inhibiting effectiveness of the silicate is detrimentally affected. The art has thus attempted to solve the gelation problem by various additives which serve to counteract the tendency of inorganic sodium silicates to gel in alcohol-based antifreeze solutions as evidenced, for example, by U.S. Pat. Nos. 4,149,985, 4,457,852 and 4,460,478.

The present invention is directed to minimizing (if not eliminating entirely) the tendency of inorganic sodium silicates to gel in alcohol-based antifreeze solutions while simultaneously offering maximum corrosion-inhibiting effectiveness. Broadly, therefore, the present invention is directed to novel anti-corrosion coolant solutions for automotive cooling systems which include a synergistic corrosion-inhibiting effective combination of a sodium silicate having an unusually low ratio of silica to sodium oxide, and sodium nitrate. More specifically, the present invention is directed to alcohol-based liquid solutions for automotive cooling systems which include an anti-corrosive effective amount of (i) a sodium silicate corrosion inhibitor having a ratio of silica ($SiO_2$) to sodium oxide ($Na_2O$) of greater than 1.0 to about 2.4 (preferably between about 1.5 and 2.0), and (ii) sodium nitrate.

The sodium silicate is typically employed in the alcohol-based liquid coolant system solutions of this invention in an amount sufficient to yield between about 0.01 to 0.2 wt. % silica (more preferably between 0.05 to about 0.06 wt. % silica) based on the total weight of the liquid solution. The sodium nitrate is most preferably employed in the liquid coolant system concentrates of this invention in an amount of between about 0.1 to about 1.0 wt. % based on the total weight of the liquid solution.

The solutions according to the present invention may contain other additives conventionally employed in anti-freeze concentrates. For example, inorganic salts (e.g., sodium phosphate) may be employed in minor amounts up to about 1.5 wt. % based on the total solution weight.

Further aspects and advantages of this invention will become clearer after careful consideration is given to the detailed description of the preferred exemplary embodiments thereof which follows.

BRIEF DESCRIPTION OF THE ACCOMPANYING DRAWINGS

Reference will hereinafter be made to the accompanying drawings wherein.

Figure 2A:
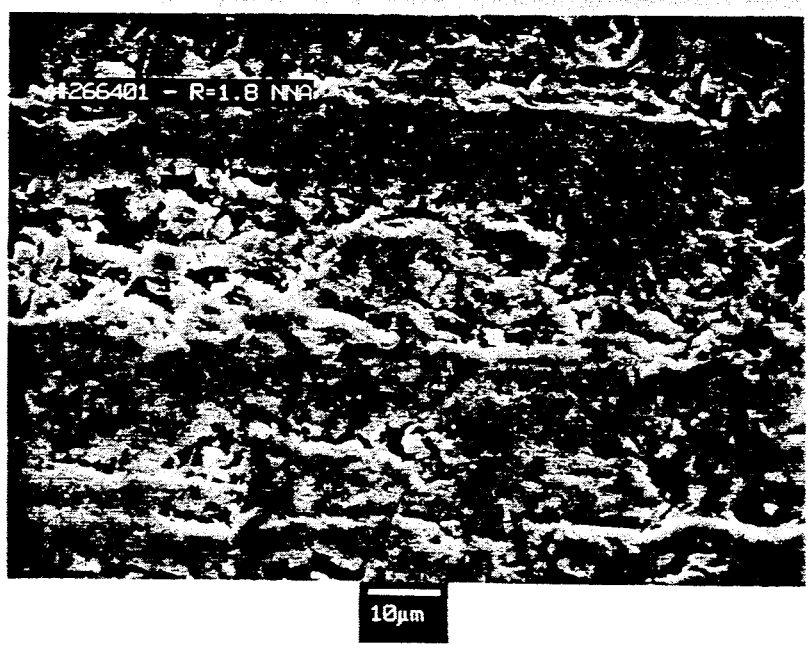
FIG. 2a is a photomicrograph taken at 1000× magnification showing the surfaces of a polished aluminum specimen after testing with an aqueous solution according to the present invention containing sodium silicate ($SiO_2$:$Na_2O$=1.8), $NaNO_3$, and $NaCl$ according to the examples which follow.
Figure 2B:
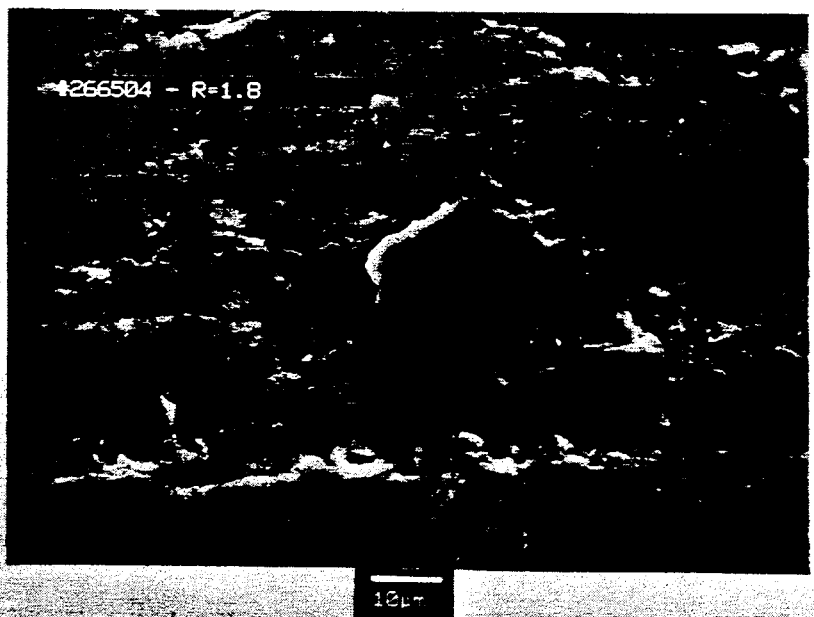
FIG. 2b is a photomicrograph similar to FIG. 2a but comparing the effects on the surface of an aluminum specimen of a solution outside the scope of this invention containing only sodium silicate ($SiO_2$:$Na_2O$=1.8) and $NaCl$.
Figure 2C:
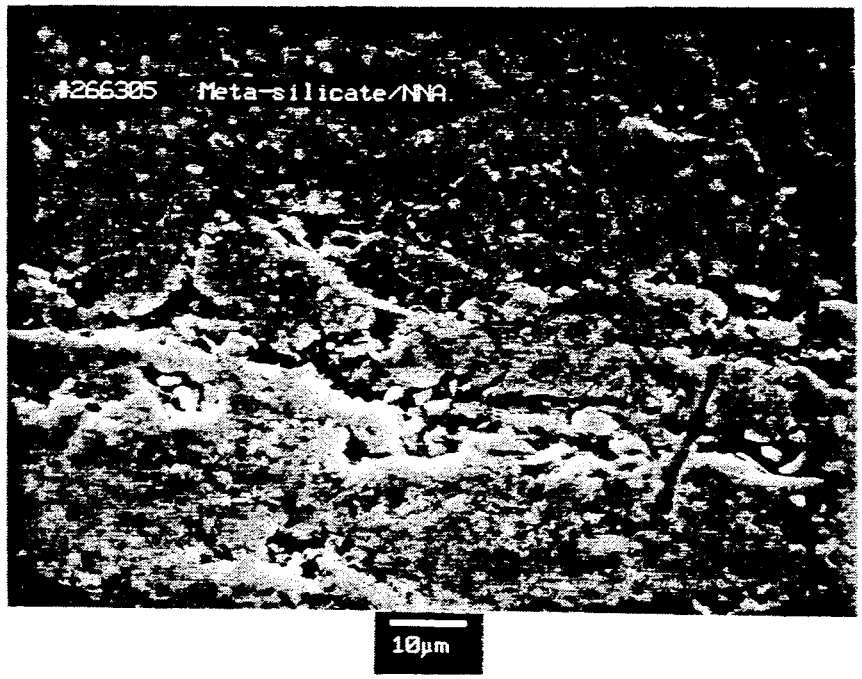
Figure 2D:
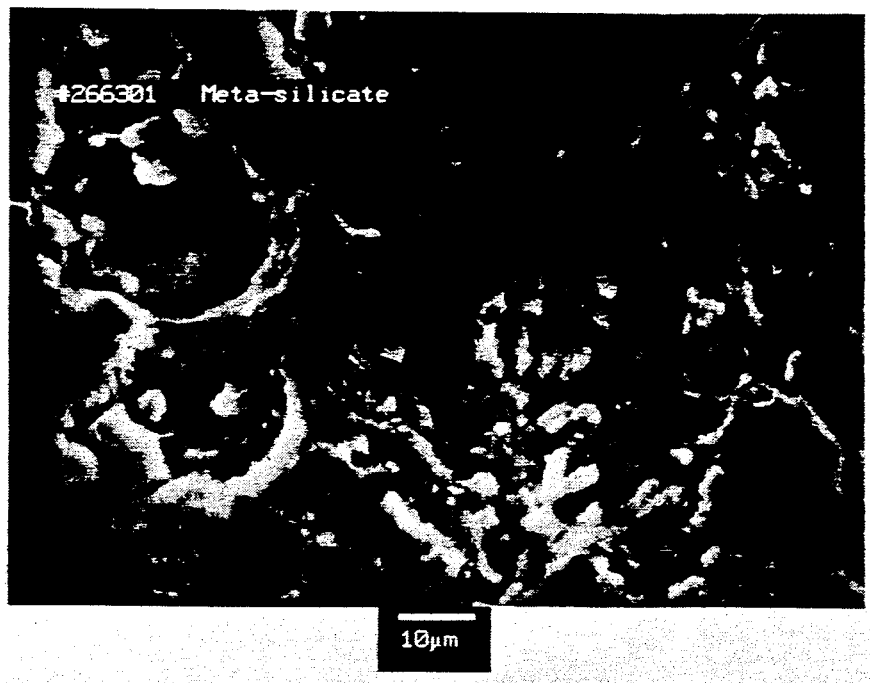

FIG. 2c is a photomicrograph taken at 1000× magnification showing the surfaces of a polished aluminum specimen after testing with an aqueous solution according to the present invention containing sodium silicate ($SiO_2$:$Na_2O$=1.0), $NaNO_3$, and $NaCl$ according to the examples which follow; and FIG. 2d is a photomicrograph similar to FIG. 2c but comparing the effects on the surface of an aluminum specimen of a solution outside the scope of this invention containing only sodium silicate ($SiO_2$:$Na_2O$=1.0) and $NaCl$.

DETAILED DESCRIPTION OF THE PREFERRED EXEMPLARY EMBODIMENTS

The present invention will become more clear after careful consideration is given to the following nonlimiting examples.

Electrochemical noise appearing in corrosion potential ($E_{corr}$) and electrochemical impedance spectra (EIS) were used to study the synergism between nitrate and silicate in the inhibition of aluminum. It has been found that silicates and nitrate individually did not protect aluminum. However, when combined (especially at unusually low ratios of silica to sodium oxide of between about 1.5 to 2.0), the protection was greatly enhanced as evidenced by the reduction of noise and the elevation of both $E_{corr}$ and the polarization resistance ($R_p$).

In the examples which follow, reagent grade sodium chloride, sodium nitrate and sodium metasilicate (having a ratio of $SiO_2$ to $Na_2O$ of 1.0, and henceforth referenced as "1.0R") were used. The silicate with a $SiO_2$/$Na_2O$ ratio of 1.8 was obtained commercially as a specially filtered solution containing 24.1% $SiO_2$ and 13.4% $Na_2O$ (referenced henceforth as "1.8R").

Distilled water was employed to prepare all solutions, it being understood that, in practice, the corrosion inhibitors will be employed in an alcohol-based (e.g., ethylene glycol) liquid concentrate solution which is then added by the consumer to the water in an automotive coolant system to achieve approximately a 50/50 blend of water and glycol so as to provide anti-freeze protection. In this connection, although the solutions that were tested were non-alcoholic aqueous solutions, the data is expected to be applicable to 50/50 alcohol/water solutions as well. The solutions that were evaluated in the following examples also contained 100 ppm of sodium chloride so as to enhance localized corrosion. That is, the sodium chloride was present in the solutions so as to evaluate the respective efficacy of the various additives in overcoming the corrosive aggressiveness of the chloride ion.

Keithley Model 616 and 614 digital electrometers were used to measure the corrosion potentials which were recorded on a two channel Houston Instrument recorder. For electrochemical impedance spectroscopy (EIS), a Solartron 1255 frequency analyser/EG&G PARC Model 273 Potentiostat/Galvanostat combination was used. The experiments were conducted using EG&G PARC Model 388 software and the modeling and graphics were carried out using Boukamp software as described in B.A. Boukamp, "Non-linear Least Squares Fit of AC-Impedance Measurements", *Computer Aided Acquisition and Analysis of Corrosion Data,* Electrochem. Soc., 146 (1985) (incorporated expressly hereinto by reference).

The test cells consisted of a 500 ml flat-bottomed beaker as described in S.T. Hirozawa, "Study of the Mechanism for the Inhibition of Localized Corrosion of Aluminum by Galvanostaircase Polarization", *Corrosion Inhibition,* NACE, pp. 105-112 (1988) and F. Mansfeld, *Corrosion.* 36, 301 (1981) (the content of each being expressly incorporated hereinto by reference), with the exception being that the silver/silver polysulfide reference electrode was substituted for the SCE. The working electrode was 3003-H14 (UNS A93003) aluminum in sheet form whereas the counter electrode was a pair of ultrafine graphite rods. Circles having diameters of 1.5 cm were cut and prepared according to ASTM Practice G1 using 600 grit diamond slurry on a flat lapping machine by Metals Samples and used without further preparation. The specimens were mounted in flat specimen holders.

The solutions were prepared in the cell and attached to the cell cover which had provisions for the electrodes and a thermocouple. Data recording began after the positive lead of the electrometer was connected to the working electrode, and the negative lead was connected to the reference electrode. The solution was continually stirred and heated until the solution temperature stabilized at 82.2° C. (180° F.) for fifteen (15) minutes (thereby simulating the temperature of an automotive coolant system), after which stirring was discontinued. The EIS evaluation was begun 5.5 hours after the solution heater was turned on.

EXAMPLE 1

Figure 1:
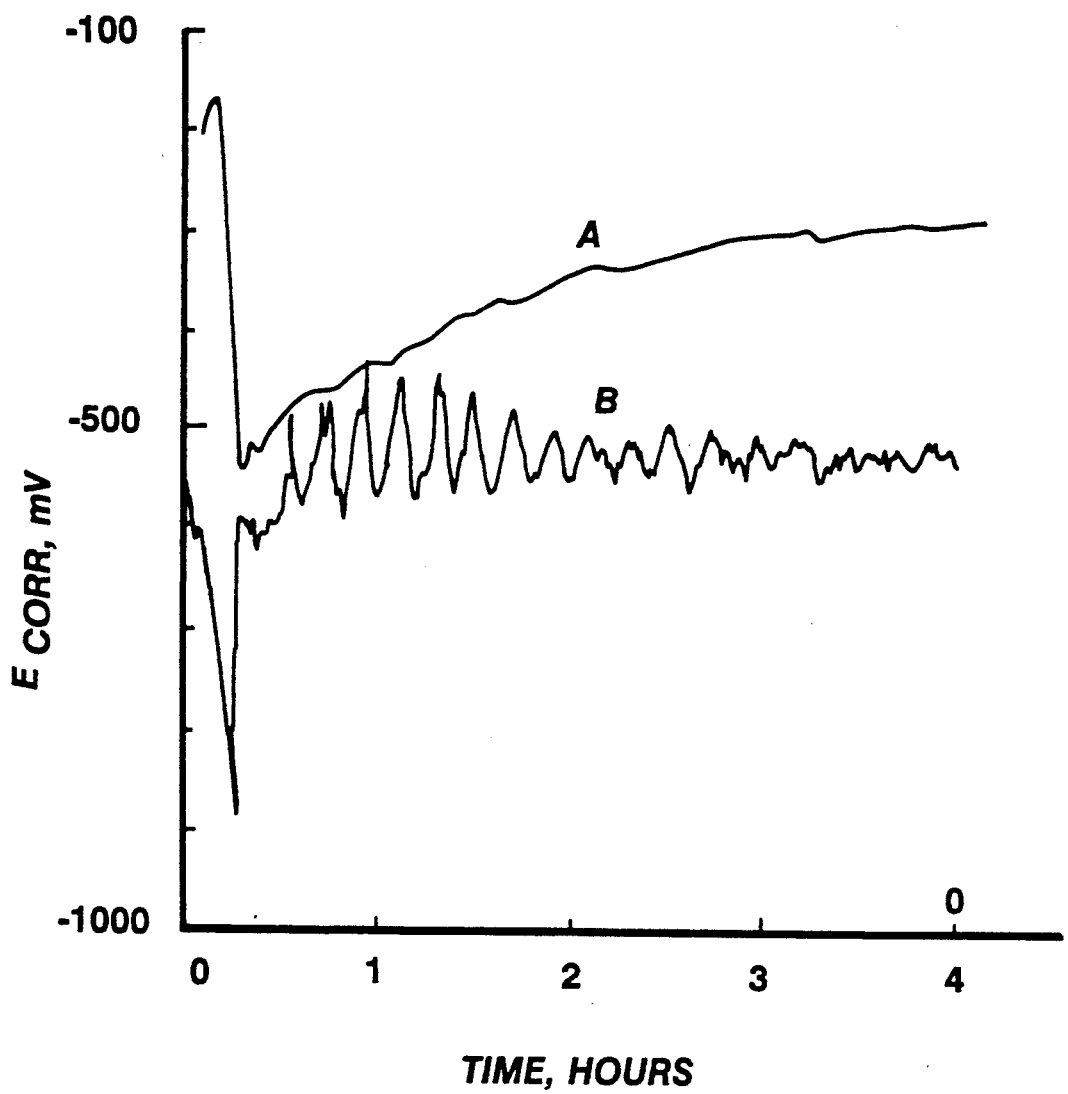
FIG. 1 is a plot of the corrosion potential ($E_{corr}$) data versus time for $NaNO_3$-containing silicate solutions having a $SiO_2$ to $Na_2O$ ratio of 1.8 (curve A) and a $SiO_2$ to $Na_2O$ ratio of 1.0 (curve B)

A plot of $E_{corr}$ vs time was prepared from the $E_{corr}$ data at 82.2° C. using the above procedures and appears as accompanying FIG. 1. As is shown, the addition of sodium nitrate to the 1.8R solution significantly reduced noise (curve A in FIG. 1) as compared to the sodium nitrate/1.0R solution (curve B in FIG. 1). In addition, it will be observed that the $E_{corr}$ data in FIG. 1 for the NaNO3/1.8R solution was significantly elevated over the $E_{corr}$ data for the NaNO3/1.0R solution thereby indicating greater corrosion-inhibiting effectiveness.

EXAMPLE 2

The specimen/solution interface at elevated temperature was modelled using the Boukamp equivalent circuit program. The surface film was represented electrically by a constant phase element (Q) in parallel with the polarization resistance ($R_p$). The solution resistance ($R_s$) was in series with the film components. The admittance representation of the constant phase element is given in Equation (1) below and contains two fit parameters $Y_o$ and n, with $J=\sqrt{-1}$ and $\omega=2\pi f$.

$$Y^*(\omega)=Y_o(J\omega)^n \qquad (1)$$

Non-linear least squares fitting of the model to the EIS discussed above resulted in the parameters provided in Table 1 below.

TABLE 1

| Non-linear Least Squares Fitting of EIS Data | | | | | |
|---|---|---|---|---|---|
| Sample | $R_s$ (ohm) | $R_p$ (ohm) | $Y_o$ (mho) | n | f (Hz) |
| NaCl | 1298 | 6.46E4 | 1.92E-6 | 0.88 | 1.0 |
| NaNO3/NaCl | 112.7 | 8.31E4 | 2.38E-6 | 0.90 | 0.1 |
| 1.0R/NaCl | 140 | 0.02E4 | (no data available) | | 0.16 |
| 1.0R/NaCl/NaNo3 | 76 | 4.05E4 | 3.73E-5 | 0.87 | 0.002 |
| 1.8R/NaCl | 316 | 44.7E4 | 1.14E-5 | 0.72 | 0.25 |
| 1.8R/NaCl/NaNO3 | 103 | 77.4E4 | 1.18E-5 | 0.82 | 0.016 |

The data under the "f" column in Table 1 above indicates the lowest frequency prior to the onset of noise which was determined graphically from a plot of relative residuals for chi-squared fitting of the data (which was on the order of $10^{-2}$). It is clear from Table 1 that the addition of salts consistently reduced $R_s$ and further that a trend existed among the three groupings in which the larger the value of $R_p$, the lower the f value. Correspondingly, n values increased towards unity as $R_p$ increased. It will also be observed that the data for 1.0R/NaCl could not be fit with a simple three element model and thus underscores the antisynergism between $Na_2SiO_3$ and NaCl.

EXAMPLE 3

Aluminum specimens were examined by scanning electron microscopy (SEM) following corrosion testing. Accompanying FIG. 2a shows the surface of an aluminum specimen tested with a solution of 1.8R/NaNO3/NaCl. As is shown, the specimen exhibits a relatively smooth surface with few pits or defects. However, when the NaNO3 was not present in the solution, the corrosive attack on the aluminum surface is quite noticeable as shown in accompanying FIG. 2b. As is seen therein, the surface of the aluminum specimen (covering approximately 1 cm²) had approximately 20 areas on the order of 5 to 30 μm which appear to have been pits which repassivated.

Accompanying FIGS. 2c and 2d each show the surface of aluminum specimens tested with a solution of 1.0R/NaNO3/NaCl and 1.0R/NaCl, respectively. As is seen in FIG. 2d, open pits ranging from 10 to 50 μm in diameter are present in the specimen tested with a 1.0R solution which included NaCl but not NaNO3. On the contrary, FIG. 2c shows that the specimen treated with a solution in which NaNO3 was present had a relatively smooth surface.

The $E_{corr}$ and EIS data above demonstrate the effectiveness of both low ratio of $SiO_2$ to $Na_2O$ and the presence of sodium nitrate significantly reduces the corrosive effects on aluminum. In addition, gelation problems that have plagued conventional silicate antifreeze systems have been overcome by the low ratio of $SiO_2$ to $Na_2O$.

Thus, while the invention has been described in connection with what is presently considered to be the most practical and preferred embodiment, it is to be understood that the invention is not to be limited to the disclosed embodiment, but on the contrary, is intended to cover various modifications and equivalents included within the spirit and scope of the appended claims.

What is claimed is:

1. An aqueous corrosion-inhibiting automotive coolant solution consisting essentially of water and an anti-corrosive effective amount of (i) a sodium silicate which is present in an amount to yield between about 0.01 to about 0.2 wt. % of silica based on the total solution weight, and having a ratio of silica to sodium oxide of between about 1.5 and 2.0, and (ii) sodium nitrate which is present in an amount between about 0.1 to about 1.0 wt. % based on the total solution weight.

2. A solution as in claim 1, wherein said sodium silicate corrosion inhibitor is present in an amount to yield between about 0.05 to about 0.06 wt. % of silica based on the total solution weight.

3. A solution as in claim 1 which further consists essentially of other organic or inorganic inhibitors in an amount up to about 1.5 wt. % based on the total solution weight.

4. A solution as in claim 3, which further consists essentially of sodium phosphate.

5. A method of inhibiting the corrosion of an automotive cooling system which comprises forming an aqueous corrosion-inhibiting solution in water of the automotive cooling system which solution consists essentially of an anti-corrosive effective amount of (i) a sodium silicate which is present in an amount to yield between about 0.01 to about 0.2 wt. % of silica based on the total solution weight, and having a ratio of silica to sodium oxide of between about 1.5 to 2.0, and (ii) sodium nitrate which is present in an amount between about 0.1 to about 1.0 wt. % based on the total solution weight.

6. A method as in claim 5, wherein said sodium silicate corrosion inhibitor is present in an amount to yield between about 0.05 to about 0.06 wt. % of silica based on the total solution weight.

7. A method as in claim 5, wherein the coolant solution further consists essentially of other organic or inorganic inhibitors in an amount up to about 1.5 wt. % based on the total solution weight.

8. A method as in claim 5, wherein the coolant solution further consists essentially of sodium phosphate.

* * * * *